United States Patent [19]

Segoshi

[11] Patent Number: 4,626,967
[45] Date of Patent: Dec. 2, 1986

[54] AUXILIARY LAMP ARRANGEMENT FOR AUTOMOTIVE VEHICLE OR THE LIKE

[75] Inventor: Touru Segoshi, Yokohama, Japan

[73] Assignee: Nissan Motor Co., Ltd., Yokohama, Japan

[21] Appl. No.: 711,323

[22] Filed: Mar. 13, 1985

[30] Foreign Application Priority Data

Mar. 15, 1984 [JP] Japan ................... 59-49777

[51] Int. Cl.⁴ .............................................. B60G 1/00
[52] U.S. Cl. ...................................... 362/61; 362/80; 340/87; 340/71
[58] Field of Search ....................... 362/61, 80, 82, 83, 362/268, 304, 309, 328, 329, 335, 145; 340/71, 74, 69, 87, 97

[56] References Cited

U.S. PATENT DOCUMENTS

| 2,675,534 | 4/1954 | Bryant | 340/97 |
|---|---|---|---|
| 3,665,392 | 5/1972 | Annas | 340/97 |
| 3,800,430 | 4/1974 | Samra | 340/87 |
| 4,367,519 | 1/1983 | Houghton et al. | 362/268 |
| 4,373,153 | 2/1983 | Sano et al. | 340/87 |
| 4,464,649 | 8/1984 | Her | 340/71 |
| 4,488,141 | 12/1984 | Ohlenforst | 340/97 |

FOREIGN PATENT DOCUMENTS 2630215 1/1978 Fed. Rep. of Germany ........ 340/97

OTHER PUBLICATIONS

J. C. Whitney & Co., 1974, p. 40–Stop & Turn Signal Light.

Primary Examiner—E. Rollins Cross
Attorney, Agent, or Firm—Schwartz, Jeffery, Schwaab, Mack, Blumenthal & Evans

[57] ABSTRACT

In order to reduce the height of an auxiliary stop or turn indication lamp which may be mounted either immediately adjacent the rear windshield or housed on top of the trunk lid of an automotive vehicle, a light bulb is arranged in an essentially vertically extending base section of a housing so that the filament thereof is located at a level just above that of the floor of an elongate capsule-like upper section provided on top of the base member. The filament is arranged parallel with a lens or similar light transmissive member which is disposed in an opening formed in the upper section.

16 Claims, 10 Drawing Figures

AUXILIARY LAMP ARRANGEMENT FOR AUTOMOTIVE VEHICLE OR THE LIKE

BACKGROUND OF THE INVENTION

1. Field of the Invention

The present invention relates generally to lamp arrangements for use in vehicles and more specifically to an improved lamp arrangement which can be disposed immediately adjacent the rear windshield or on the top of a trunk lid and which features a low profile which renders disposition of the lamp arrangement in the afore mentioned positions possible without imparing rear vision.

2. Description of the Prior Art

In a prior art arrangement disclosed in Japanese Utility Model Application First Provisional Publication No. 54-15078 it has been proposed to provide, in addition to the normally provided rear lamp cluster, an auxiliary lamp arrangement which is adapted for mounting on the rear parcel shelf of a sedan or like automotive vehicle.

This arrangement while providing highly visible additional stop and turn indications to the driver of the vehicle (or vehicles) following behind, it has suffered from the drawback that it projects undesirably into the rear field of vision of the vehicle in which it is disposed.

FIG. 1 shows a similar arrangement wherein an incandescent bulb 1 is disposed in a housing 2. The front of the housing 2 is closed by a transparent or light transmissive cover 3. As will be appreciated, by reducing the size (viz., the vertical dimensions) of the housing 2, the overall height "H" of the device can be reduced. However, due to the disposition of the bulb 1 in the illustrated manner, the inner dimensions of the housing 2 cannot be reduced beyond the diameter "D" of the bulb. In actual fact, some clearance must be provided between the bulb and the inner walls of the housing 2 so as to prevent excessive localized heating thereof by the heat radiation given off by the bulb and further to allow for the bulb to be readily inserted and removed.

Accordingly, it has been hitherto very difficult provide the desired degree of illumination without incurring loss of rearward visibility and aesthetic appearance of the device.

SUMMARY OF THE INVENTION

It is an object of the present invention to provide a lamp arrangement which has a low profile, which can produce the desired amount of illumination and which due to the low profile thereof, does not interfere with the driver's rearward field of vision.

It is a further object of the present invention to provide a lamp arrangement which can be mounted immediately adjacent the rear windshield of the vehicle or on the trunk lid of the vehicle if so desired.

In brief, the above objects are achieved by an arrangement wherein in order to reduce the height of an auxiliary stop or turn indication lamp which may be mounted either immediately adjacent the rear windshield or housed on top of the trunk lid of an automotive vehicle, a light bulb is arranged in an essentially vertically extending base section of a housing so that the filament thereof is located at a level just above that of the floor of an elongate capsule-like upper section provided on top of the base member. The filament is arranged parallel with a lens or similar light transmissive member which is disposed in an opening formed in the upper section.

More specifically, the present invention takes the form of a vehicle lamp arrangement which comprises: a housing which is arranged to be mounted on a portion of the vehicle and which is formed with an opening, the opening having a shadow which is cast into the housing; and a light source disposed within the housing so that the light generating portion of the light source is located in said shadow proximate the lower periphery of the shadow.

BRIEF DESCRIPTION OF THE DRAWINGS

The features and advantages of the present invention will become more clearly appreciated from the following description taken in conjunction with the accompanying drawings in which.

DETAILED DESCRIPTION OF THE PREFERRED EMBODIMENTS

Figure 1:
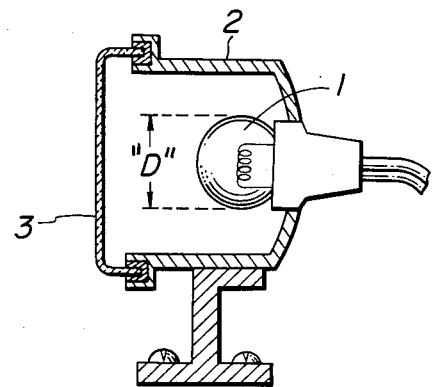
FIG. 1 shows the second of the two prior art arrangements discussed in the introductory paragraphs of the present invention.

A first embodiment of the present invention is shown in FIGS. 2 to 6 of the drawings. In this arrangement the lamp arrangement 10 is mounted on the rear parcel shelf 11 so as to be located immediately adjacent the rear windshield 12 of an automotive vehicle. As particularly clear from FIG. 4, the housing of the lamp device comprises a base portion or member 14 which is secured to the parcel shelf 11 and a capsule-like upper section 16 which is elongate in the horizontal direction. The upper section 16 is formed with an opening 18 at one end. This opening 18 is closed by a light transmissive lens member 20. The lens member 20 is secured to the upper section 20 by a grommet-like packing member or seal 21 which prevents the entry of the dust particles and the like into the interior of the housing. An incandescent bulb 22 is supported in the base portion 14 of the housing by a socket 24. This socket 24 can be detachably connected to the inner wall structure of the base member so as to facilitate ready assembly and/or repair. The base of the socket 24 and the lead wires 26 which establish electrical connection between a brake pedal switch and source of EMF (not shown), extend down through an aperture 28 formed in the parcel shelf 11. The base member 14 is secured to the shelf so as to conceal the aperture.

Figure 2:
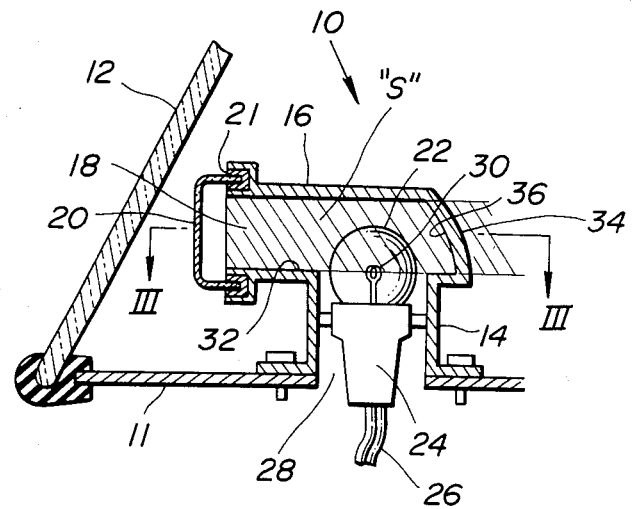
FIG. 2 shows in sectional elevation a first embodiment of the present invention.
Figure 6:
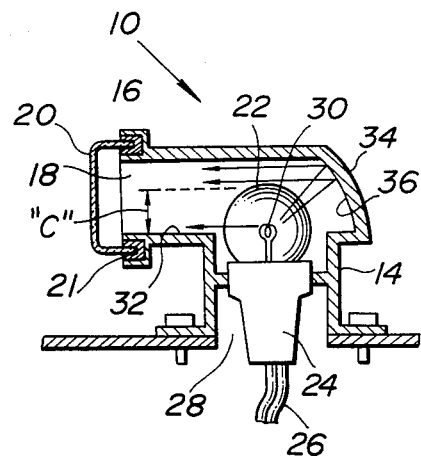
FIG. 6 is a sectional elevation similar to FIG. 2 showing the light reflection which occurs when the bulb disposed therein is energized.

As will be noted from FIGS. 2 and 6, the socket 24 is arranged to support the incandescent bulb 22 in a manner that the filament 30 thereof is essentially flush with the lower inner wall or floor 32 of the capsule-like upper section 16. Viz., the filament 30 is arranged to project slightly into the shadow "S" which is defined by projection of the opening 18 back into the housing and thus be located in the shadow near the lower periphery thereof.

Figure 3:
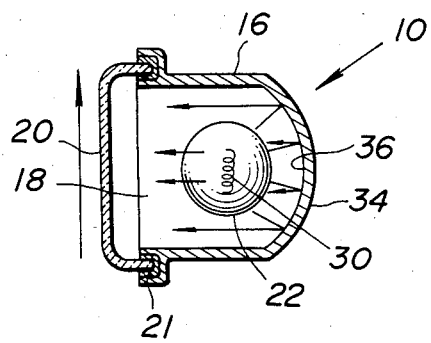
FIG. 3 shows a sectional view taken along section line III—III of FIG. 2.
Figure 4:
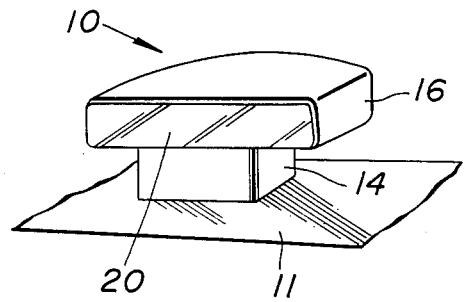
FIG. 4 is a perspective view of the arrangement shown in FIGS. 2 and 3.
Figure 5:
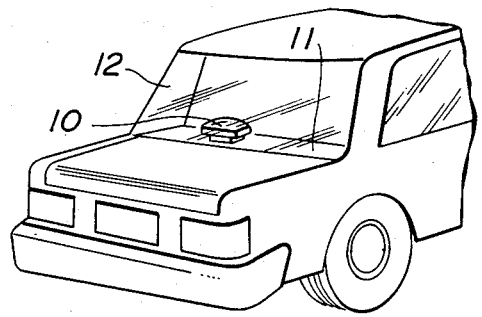
FIG. 5 is a perspective view showing the arrangement shown in FIGS. 2-4 disposed on the parcel shelf of a sedan type automotive vehicle.

The rear end wall 34 of the upper section 16, viz., the end opposite opening 18, is curved (see FIGS. 3 and 6) and preferably provided with a reflective surface 36 so that when the bulb 22 is energized in response to depression of the brake pedal (or alternatively operation of turn indicator control lever) the light rays produced by the bulb 22 are reflected from the rear end wall 34 essentially as illustrated in FIGS. 3 and 6.

It will be noted that with the first embodiment of the present invention, it is possible, if so desired, to reduce the height of the device by lowering the roof of the capsule-like section 16 until it is just above the top of the bulb 22 and thus be spaced from the floor 32 of the upper section by a distance "C". Viz., reduce the clearance between the roof and floor of the upper section 16 to approximately ½ the diameter of the bulb.

Figure 7:
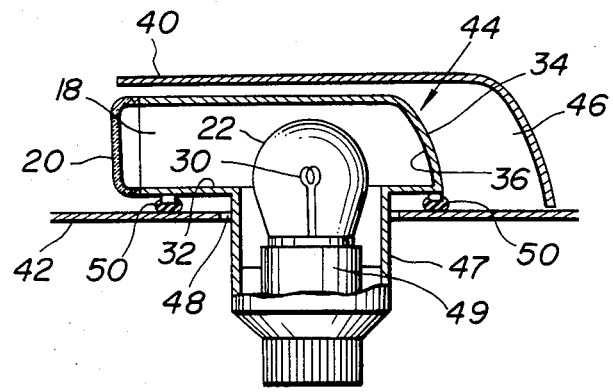
FIG. 7 is a sectional elevation showing a second embodiment of the present invention.
Figure 8:
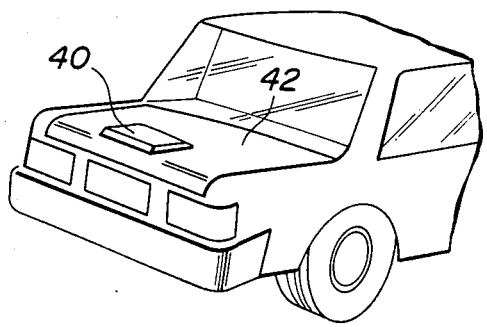
FIG. 8 is a perspective view of a sedan vehicle wherein the second embodiment is mounted on the trunk lid thereof.

FIGS. 7 and 8 show second embodiment of the present invention. This embodiment is designed to be mounted on top of the trunk lid of the vehicle. In the illustrated arrangement an air scoop-like cowl member 40 is provided on the trunk lid 42. A lamp housing 44 which is essentially similar in shape and construction to that used in the first embodiment, is disposed within the cavity 46 defined between the cowl member 40 and the upper surface of the trunk lid 42. The base portion 47 of the housing is arranged to project down through an aperture 48 formed in the trunk lid. In this embodiment the socket 49 is detachably secured to the base portion of the housing so that simply by opening the trunk lid 42 the bulb 22 may be readily exchanged in the event of filament failure or the like.

In order to prevent the entry of rain water, dust and the like into the trunk, an annular seal 50 or packing is disposed about the aperture 48 as shown, and arranged to seal the gap defined between the lower surface of capsule-like section of the housing and the top of the trunk lid.

Figure 9:
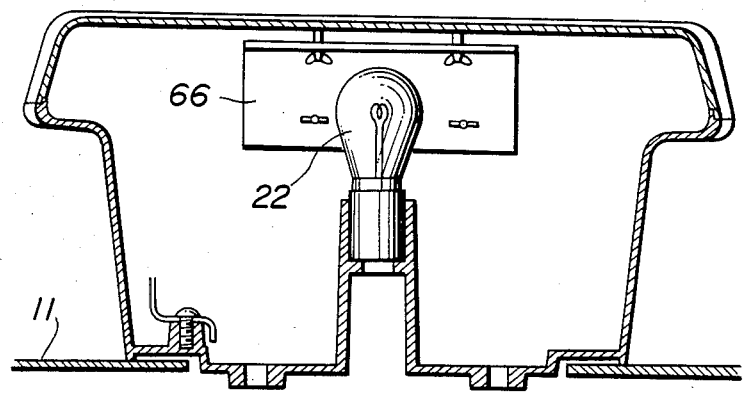
FIGS. 9 and 10 are sectional side and front elevations respectively of a third embodiment of the present invention.
Figure 10:
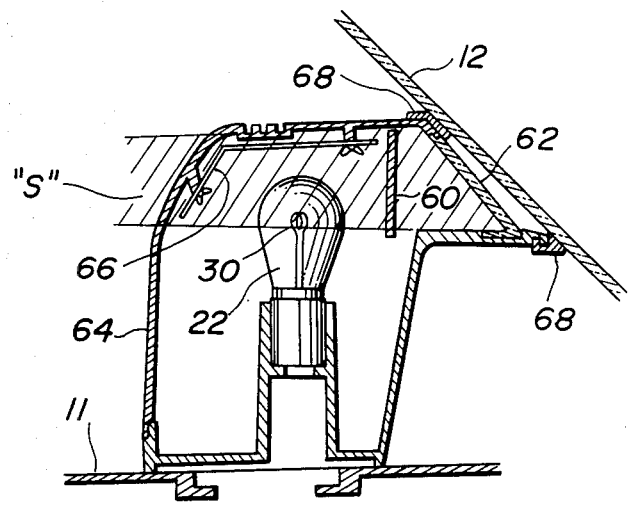

FIGS. 9 and 10 show a third embodiment of the present invention. This embodiment resembles that shown in FIGS. 2 to 6, however further features inner and outer lenses 60, 62, a detachable cover 64 for facilitating easy bulb replacement, a reflector 66 secured to the roof of the capsule-like section and an arrangement which prevents light emitted by the bulb 22 from being reflected off the rear windshield 12 and causing undesirable view impairing images thereon. The latter mentioned arrangement takes the form of an essentially rectangular member 68 which establishes contact with the inner surface of the rear windshield 12 and the outer periphery of the capsule-like upper member. Advantageously, the housing may be suitably grooved as shown, to facilitate connecting the member 68 thereto.

With the third embodiment the provision of the reflector 66 in a spaced relationship with the inner surface of the upper section, provides an air space which thermally insulates the roof of the upper section preventing any localized heating thereof.

To maximize the amount of light emitted from the lamp arrangements according to the present invention, it is deemed advantageous to arrange for the filament 30 of the bulb 22 to be essentially parallel (see FIG. 3) with the lens or lenses of the lamp arrangement in which it is disposed.

What is claimed is:

1. In a vehicle
   a lamp arrangement comprising:
   a housing which is arranged to be mounted on a portion of said vehicle and which is formed with an opening, said opening having a shadow which is cast into said housing; and
   a light source disposed within said housing so that the light generating portion of said light source is located in the lower peripheral portion of said shadow.

2. A lamp arrangement for use with a vehicle, comprising:
   a housing having an opening closed by a light transmissive member; and
   a light source disposed in said housing so that a light generating portion thereof is located at a level proximate the level of the lower periphery of said light transmissive member.

3. In a vehicle
   a lamp arrangement comprising:
   a housing which is arranged to be mounted on a portion of said vehicle and which is formed with an opening, said opening having a lower periphery; and
   a light source disposed within said housing so that the light generating portion of said light source is located at essentially the same level as said lower periphery.

4. A lamp arrangement as claimed in claim 1, wherein said light generating portion takes the form of an elongate filament, said filament being arranged to be essentially parallel with a plane defined by said opening.

5. A lamp arrangement as claimed in claim 1, wherein said housing includes:
   a base portion in which said light source is supported and
   an upper section being elongate in a direction essentially normal to said base portion.

6. A lamp arrangement as claimed in claim 5, wherein said base portion is arranged to be connected to a structure of said vehicle located immediately adjacent a rear windshield of the vehicle.

7. A lamp arrangement as claimed in claim 5, wherein said base portion is arranged to extend through an aperture formed in a trunk lid of said vehicle.

8. A lamp arrangement as claimed in claim 7, wherein said upper section is arranged to be housed in a cowl member disposed on said trunk lid.

9. A lamp arrangement as claimed in claim 5, wherein said upper section includes a wall section which is arranged to reflect light emitted from said light source toward said opening.

10. A lamp arrangement as claimed in claim 1, further comprising a light transmissive member disposed within said housing so as to close said opening.

11. A lamp arrangement as claimed in claim 6, wherein said housing is provided with a section about said opening which contacts said rear windshield and prevents ight emitted from said light source from being reflected off said rear windshield in a manner to enter a zone on the inboard side of said rear windshield.

12. In a vehicle having:
    a cabin;

a windshield at one end of said cabin; and
a structure immediately adjacent said windshield;
a lamp arrangement comprising:
a base portion fixed to said structure and arranged to extend upwardly toward said windshield;
an upper section disposed on said base portion, said upper section having an opening formed therein, said opening being oriented toward said windshield, said opening having a shadow which projects back into said upper section;
a light transmissive member disposed so as to close said opening;
a light source disposed in said base portion, said light source having a light generating portion, said light generating portion being arranged to be located in the lower portion of said shadow and essentially aligned with a lower periphery of said opening; and
a wall section defined in said upper section for reflecting light emitted from said light source toward said opening.

13. A lamp arrangement as claimed in claim 12, further comprising a member disposed about said opening, said member extending between said upper section and said windshield and which contacts said windshield to prevent light emitted from said light source from entering said cabin.

14. A lamp arrangement as claimed in claim 13, wherein said light generating portion takes the form of an elongate filament, said filament being arranged to be essentially parallel with a plane defined by said opening.

15. In a vehicle
a trunk lid;
an aperture formed in said trunk lid;
a cowl member disposed on said trunk lid so as to extend over said aperture; and
a lamp arrangement disposed on said trunk lid so as to enclosed by said cowl member, said lamp arrangement comprising:
a base member which extends through said aperture;
an upper section disposed on top of said base member and which is located in the space defined between said trunk lid and said cowl member;
means defining an opening in said upper section, said opening having a shadow which extends back into said upper section;
a light transmissive member disposed so as to close said opening; and
a light source mounted in said base member, said light source having a light generating element, said light generating element being arranged to project into the lower peripheral portion of said shadow and thus be essentially aligned with the lower periphery of said opening.

16. In a vehicle having:
a cabin having a front-to-rear axial direction;
a windshield at one end of said cabin; and
a structure immediately adjacent said windshield;
a lamp arrangement comprising:
a base portion fixed to said structure and arranged to extend upwardly toward said windshield;
a generally closed upper section elongated along said axial direction and disposed on said base portion, said upper section having an opening formed therein, said opening being oriented toward said windshield, and said opening defining a field of view within said upper section when viewed from the direction of said windshield;
a light transmissive member disposed so as to close said opening;
an incandescent light source disposed in said base portion and having a filament, said light source being arranged so that the filament is located in the lower portion of said field of view defined by said opening; and
means, including a reflective surface in said upper section, for reflecting light from said light source essentially parallel to said axial direction toward said opening.

* * * * *